(12) United States Patent
Seong et al.

(10) Patent No.: US 10,399,448 B2
(45) Date of Patent: Sep. 3, 2019

(54) ALIGNMENT METHOD FOR WIRELESS POWER TRANSFER COIL AND APPARATUS FOR THE SAME

(71) Applicants: HYUNDAI MOTOR COMPANY, Seoul (KR); KIA MOTORS CORPORATION, Seoul (KR); KONKUK UNIVERSITY INDUSTRIAL COOPERATION CORP., Seoul (KR)

(72) Inventors: Jae Yong Seong, Anyang-si (KR); Kong Pengfei, Seoul (KR); Won Shil Kang, Seoul (KR); Hyun Chul Ku, Seoul (KR); Jong Gyun Lim, Seoul (KR)

(73) Assignees: Hyundai Motor Company, Seoul (KR); Kia Motors Corporation, Seoul (KR); Konkuk University Industrial Cooperation Corp., Seoul (KR)

( * ) Notice: Subject to any disclaimer, the term of this patent is extended or adjusted under 35 U.S.C. 154(b) by 298 days.

(21) Appl. No.: 15/455,794

(22) Filed: Mar. 10, 2017

(65) Prior Publication Data

US 2017/0259680 A1 Sep. 14, 2017

(30) Foreign Application Priority Data

Mar. 11, 2016 (KR) .................. 10-2016-0029644

(51) Int. Cl.
*H02J 50/80* (2016.01)
*B60L 11/18* (2006.01)
(Continued)

(52) U.S. Cl.
CPC ........... *B60L 11/1831* (2013.01); *B60L 53/12* (2019.02); *B60L 53/39* (2019.02); *B60L 53/60* (2019.02);
(Continued)

(58) Field of Classification Search
CPC ......... H04W 4/16; H04W 4/14; H04W 12/08; H04W 12/02; G06F 17/30598;
(Continued)

(56) References Cited

U.S. PATENT DOCUMENTS

2014/0217966 A1\* 8/2014 Schneider ............... H02J 50/12
320/108
2018/0054086 A1\* 2/2018 Jung ....................... H01F 38/14

FOREIGN PATENT DOCUMENTS

JP 2010-246348 A 10/2010
KR 10-2010-0056178 A 5/2010
(Continued)

*Primary Examiner* — Drew A Dunn
*Assistant Examiner* — Sailesh Thapa
(74) *Attorney, Agent, or Firm* — Morgan, Lewis & Bockius LLP

(57) ABSTRACT

Disclosed are alignment methods and apparatuses for power transmission/reception coils in an electric vehicle wireless power transfer system. An alignment method may comprise moving a primary coil such that a reference center point of the primary coil sequentially passes through a plurality of measurement points located on the primary coil or located outside the primary coil; measuring physical quantities induced in the primary coil by a power or a magnetic field of a secondary coil magnetically coupled with the primary coil at the reference center point and the plurality of measurement points; and calculating a relative position of the primary coil with respect to the secondary coil based on the measured physical quantities.

13 Claims, 14 Drawing Sheets

(51) Int. Cl.
   *H02J 50/90* (2016.01)
   *H02J 50/12* (2016.01)
   *B60L 53/12* (2019.01)
   *B60L 53/39* (2019.01)
   *B60L 53/60* (2019.01)
   *B60L 53/66* (2019.01)
   *H02J 7/02* (2016.01)

(52) U.S. Cl.
   CPC ............ *B60L 53/665* (2019.02); *H02J 50/12* (2016.02); *H02J 50/80* (2016.02); *H02J 50/90* (2016.02); *H02J 7/025* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
   CPC ..... H04L 51/12; H04L 63/0227; H04L 51/28; H04M 3/436; H04M 3/42068; H04M 3/42042
   See application file for complete search history.

(56) References Cited

FOREIGN PATENT DOCUMENTS

| | | | |
|---|---|---|---|
| KR | 10-2011-0039624 A | | 4/2011 |
| KR | 1020150031038 | * | 3/2015 |

* cited by examiner

ALIGNMENT METHOD FOR WIRELESS POWER TRANSFER COIL AND APPARATUS FOR THE SAME

CROSS-REFERENCE TO RELATED APPLICATION

This application claims the benefit of priority to Korean Patent Application No. 2016-0029644 filed in the Korean Intellectual Property Office (KIPO) on Mar. 11, 2016, the entire contents of which are hereby incorporated by reference.

TECHNICAL FIELD

The present disclosure relates to alignment technologies for a wireless power transfer system, and more particularly, to methods for performing alignment between transmission/reception coils in an electric vehicle (EV) wireless power transfer system and apparatuses for the same.

BACKGROUND

An electric vehicle (EV) is a type of vehicle that is driven by a battery powered motor, has fewer air pollution sources such as exhaust gas and noise than a conventional gasoline engine vehicle, and has advantages such as fewer failures, a long life, and simple driving operation.

An EV is classified into a hybrid electric vehicle (HEV), a plug-in hybrid electric vehicle (PHEV), and an electric vehicle (EV) according to the driving source. The HEV has an engine as a main power source and a motor as an auxiliary power source. The PHEV has a motor as a main power source and an engine mainly used when a battery is being discharged. The EV does not have an engine, and has a motor as its sole driving source.

In order to charge a battery mounted on the EV using a wireless charging method, it may be necessary to couple a primary coil of a charging station with a secondary coil of the EV using magnetic resonance. Also, in order to improve efficiency of wireless charging, it may be necessary to align the primary coil with the secondary coil. In a magnetic resonant wireless power transfer system, if the primary coil and the secondary coil are not aligned, the efficiency of wireless power transfer may be degraded drastically.

For example, as shown in FIG. 1, when the EV has a secondary coil (referred to as 'Rx coil') magnetically coupled to a primary coil (referred to as 'Tx coil') installed on the ground, the secondary coil should be aligned with the primary coil. Otherwise, for example, as the distance (a) between a first extension line, extended along the central axis of the Tx coil in the form of a circular ring, and the second extension line, extended along the central axis of the Rx coil in the form of a circular ring, increases the efficiency of power transfer may decrease drastically. Here, the diameter of the primary and secondary coil may be assumed to be 300 mm and the distance (d) between them may be assumed to be 105 mm.

As shown in FIG. 2, the efficiency of power transfer (represented with S-parameter S21) in the above-described wireless power transfer system having the primary coil and the secondary coil is drastically reduced from −2.5 dB to −22.5 dB, as the distance (a) between the center axes of the Tx coil and the Rx coil is increased from 0 to 450 mm by 50 mm.

Meanwhile, one of conventional alignment methods aligns a vehicle mounting a secondary coil with a primary coil of a ground assembly using a rear camera of the vehicle. On the other hand, another conventional alignment method aligns a primary coil in a movable charging pad with a secondary coil of a vehicle by moving the movable charging pad after the vehicle is parked with a speed bump in a parking area.

However, the above-described conventional techniques require an intervention of a user in the alignment of the coils, resulting in a large deviation in alignment and inconvenience to the user, and therefore, even slight coil misalignment may cause drastic system performance degradation. Therefore, because the magnetic resonant wireless power transfer system is sensitive to coil misalignment, it is difficult for the above-described conventional techniques to realize optimal power transfer efficiency, resulting in poor system stability and reliability.

Thus, in a wireless power transfer system for charging a high-voltage battery mounted on a vehicle, an efficient method of precisely aligning the primary coil of the ground assembly disposed in the charging station with the secondary coil of the vehicle assembly disposed in the vehicle is needed.

SUMMARY

Accordingly, exemplary embodiments of the present disclosure are provided to overcome the limitations and supplement the disadvantages of the related art.

Exemplary embodiments of the present disclosure provide an alignment method for wireless power transfer coils that can effectively perform magnetic field alignment between a primary coil and a secondary coil of a vehicle assembly, without using an auxiliary coil or an auxiliary means, in a wireless power transfer system for an EV, PHEV, or HEY.

Exemplary embodiments of the present disclosure also provide an alignment apparatus for wireless power transfer coils that can effectively perform magnetic field alignment between a primary coil and a secondary coil of a vehicle assembly, without using an auxiliary coil or an auxiliary means, in a wireless power transfer system.

In order to achieve the above-described objective, an aspect of the present disclosure provides an alignment method for wireless power transfer coils. The method may comprise moving a primary coil such that a reference center point of the primary coil sequentially passes through a plurality of measurement points located on the primary coil or located outside the primary coil, wherein the reference center point and the plurality of measurement points constitute a first candidate group; measuring physical quantities induced in the primary coil by a power or a magnetic field of a secondary coil magnetically coupled with the primary coil at the reference center point and the plurality of measurement points; and calculating a relative position of the primary coil with respect to the secondary coil based on the measured physical quantities.

Here, the reference center point and points adjacent to each other among the measurement points may form a triangular or rectangular shape in a movement path including the reference center point and the measurement points or on a plane including the movement path.

Also, moving of the primary coil may be performed along the movement path spirally passing the measurement points from the reference center point.

Here, the physical quantities comprise voltage, current, power, power transfer efficiency, coupling coefficients or a combination thereof.

Here, the method may further comprise, after calculation of the relative position of the primary coil, adjusting a position of the primary coil by moving the reference center point to a measurement point representing a maximum value of the physical quantities.

Also, the method may further comprise, after adjustment of the position of the primary coil, measuring second physical quantities for a second candidate group including the moved reference center point and a plurality of measurement points corresponding to the moved reference center point; and calculating a second relative position of the primary coil based on the second physical quantities.

Also, measurement of the second physical quantities may be performed along a second movement path consisting of remaining points of the second candidate group except points overlapped with the points included in the first candidate group.

In order to achieve the above-described objective, another aspect of the present disclosure provides an alignment method for wireless power transfer coils. The method may comprise moving a secondary coil mounted on a vehicle such that a reference center point of the secondary coil passes through a plurality of measurement points located on the secondary coil or located outside the secondary coil, wherein the reference center point and the plurality of measurement points constitute a first candidate group; measuring physical quantities induced in the secondary coil by a power or a magnetic field of a primary coil magnetically coupled with the secondary coil at the reference center point and the plurality of measurement points; and calculating a relative position of the secondary coil with respect to the primary coil based on the physical quantities.

Here, the reference center point and points adjacent to each other among the measurement points may form a triangular or rectangular shape in a movement path including the reference center point and the measurement points and on a plane including the movement path.

Also, moving of the secondary coil may be performed along the movement path spirally passing the measurement points from the reference center point.

Here, the method may further comprise, after calculation of the relative position of the secondary coil, adjusting a position of the secondary coil by moving the reference center point to a measurement point representing a maximum value of the physical quantities; measuring second physical quantities for a second candidate group including the moved reference center point and a plurality of measurement points corresponding to the moved reference center point; and calculating a second relative position of the secondary coil based on the second physical quantities.

Also, measurement of the second physical quantities may be performed along a second movement path consisting of remaining points of the second candidate group except points overlapped with points included in the first candidate group.

Here, the method may further comprise, after the calculation of the relative position of the secondary coil, transmitting, by a vehicle assembly (VA) controller or an alignment apparatus connected to the VA controller controlling operation of the secondary coil, information on the relative position or a position adjustment request signal based the relative position to a ground assembly (GA) controller controlling operation of the primary coil.

In order to achieve the above-described objective, yet another aspect of the present disclosure provides an alignment method for wireless power transfer coils. The method may comprise moving a primary coil such that a reference center point of the primary coil sequentially passes through a plurality of measurement points located on the primary coil or located outside the primary coil, wherein the reference center point and the plurality of measurement points constitute a first candidate group; measuring physical quantities induced in the primary coil by a power or a magnetic field of a secondary coil magnetically coupled with the primary coil at the reference center point and the plurality of measurement points; and estimating a current position of the primary coil by comparing the physical quantities at the measurement points with a reference profile including values of the power or magnetic field previously stored according to a moving direction of and a distance from the secondary coil.

Here, estimation of the current position of the primary coil may include converting the physical quantities into a position value in a rectangular coordinate system including the values of the power or magnetic field previously stored according to the moving direction of and the distance from the secondary coil; and converting the position value into a vector value for the primary coil with respect to the secondary coil.

Here, the reference profile may include a look-up table in which the values of the power or magnetic field are stored, and the estimation of the current position of the primary coil may include finding values similar to the physical quantities in the look-up table.

Also, the method may further comprise, when the values similar to the physical quantities are not found in the estimation of the current position of the primary coil, after the estimation, moving the reference center point to a measurement point representing a maximum value among the physical quantities; measuring second physical quantities for a second candidate group including the moved reference center point and a plurality of measurement points corresponding to the moved reference center point; and estimating again the current position of the primary coil according to the second physical quantities.

Also, the method may further comprise, when the values similar to the physical quantities are not found in the estimation of the current position of the primary coil, after the estimation, sequentially moving the reference center point to two opposing measurement points among the measurement points; measuring second and third physical quantities for two candidate groups with the two measurement points as respective reference center points; and moving the reference center point to a measurement point having a maximum value among the second and third physical quantities or a measurement point belonging to a candidate group having a larger average value among the two candidate groups, wherein the current position of the primary coil is estimated again based on the physical quantities of the candidate group corresponding to the measurement point to which the reference center point is moved.

In order to achieve the above-described objective, yet another aspect of the present disclosure provides an alignment method for wireless power transfer coils. The method may comprise moving a secondary coil such that a reference center point of the secondary coil sequentially passes through a plurality of measurement points located on the secondary coil or located outside the secondary coil, wherein the reference center point and the plurality of measurement points constitute a first candidate group; measuring physical quantities induced in the secondary coil by a power or a magnetic field of a primary coil magnetically coupled with the secondary coil at the reference center point and the plurality of measurement points; and estimating a current position of the secondary coil by comparing the physical quantities at the measurement points with a reference profile including values of the power or magnetic field previously stored according to a moving direction of and a distance from the primary coil.

Here, estimation of the current position of the secondary coil may include converting the physical quantities into a position value in a rectangular coordinate system including the values of the power or magnetic field previously stored according to the moving direction of and the distance from the primary coil; and converting the position value into a vector value for the secondary coil with respect to the primary coil.

Here, the method may further comprise, after the estimation of the current position of the secondary coil, transmitting, by a vehicle assembly (VA) controller or an alignment apparatus connected to the VA controller controlling operation of the secondary coil, the position value, the vector value, or information on a relative position based on the position value or the vector value, or a position adjustment request signal for the primary coil based on the position value or the vector value to a ground assembly (GA) controller controlling operation of the primary coil.

In order to achieve the above-described objective, yet another aspect of the present disclosure provides an alignment apparatus for wireless power transfer coils. The apparatus may comprise a storage and a controller executing a program stored in the storage, and the controller may be configured by the program to move a secondary coil mounted on a vehicle such that a reference center point of the secondary coil passes through a plurality of measurement points located on the secondary coil or located outside the secondary coil, wherein the reference center point and the plurality of measurement points constitute a first candidate group; obtain physical quantities which are induced in the secondary coil by a power or a magnetic field of a primary coil magnetically coupled with the secondary coil, and measured at the reference center point and the plurality of measurement points; and calculate a relative position of the secondary coil with respect to the primary coil based on the physical quantities.

Here, the controller may be further configured to, after calculation of the relative position of the secondary coil, adjust a position of the secondary coil by moving the reference center point to a measurement point representing a maximum value of the physical quantities; obtain second physical quantities for a second candidate group including the moved reference center point and a plurality of measurement points corresponding to the moved reference center point; and calculate a second relative position of the secondary coil based on the second physical quantities.

Here, the controller may be further configured to, after the relative position is calculated, estimate a current position of the secondary coil by comparing the physical quantities with a reference profile including values of the power or magnetic field previously stored according to a moving direction of and a distance from the primary coil.

Here, the reference center point and points adjacent to each other among the measurement points may form a triangular or rectangular shape in a movement path including the reference center point and the measurement points or on a plane including the movement path.

Using the above-described method or apparatus for aligning the wireless power transfer coils according to exemplary embodiments of the present disclosure, it is possible to effectively perform magnetic field alignment between the primary coil and the secondary coil in the wireless power transfer for EVs, thereby improving power transfer efficiency and improving user convenience.

Further, since alignment in the wireless power transfer system can be performed without using auxiliary coils or other auxiliary means, there is an advantage that the system stability and reliability can be improved and the maintenance cost can be reduced.

BRIEF DESCRIPTION OF THE DRAWINGS

Exemplary embodiments of the present disclosure will become more apparent by describing in detail exemplary embodiments of the present disclosure with reference to the accompanying drawings, in which.

DETAILED DESCRIPTION

Figure 1:
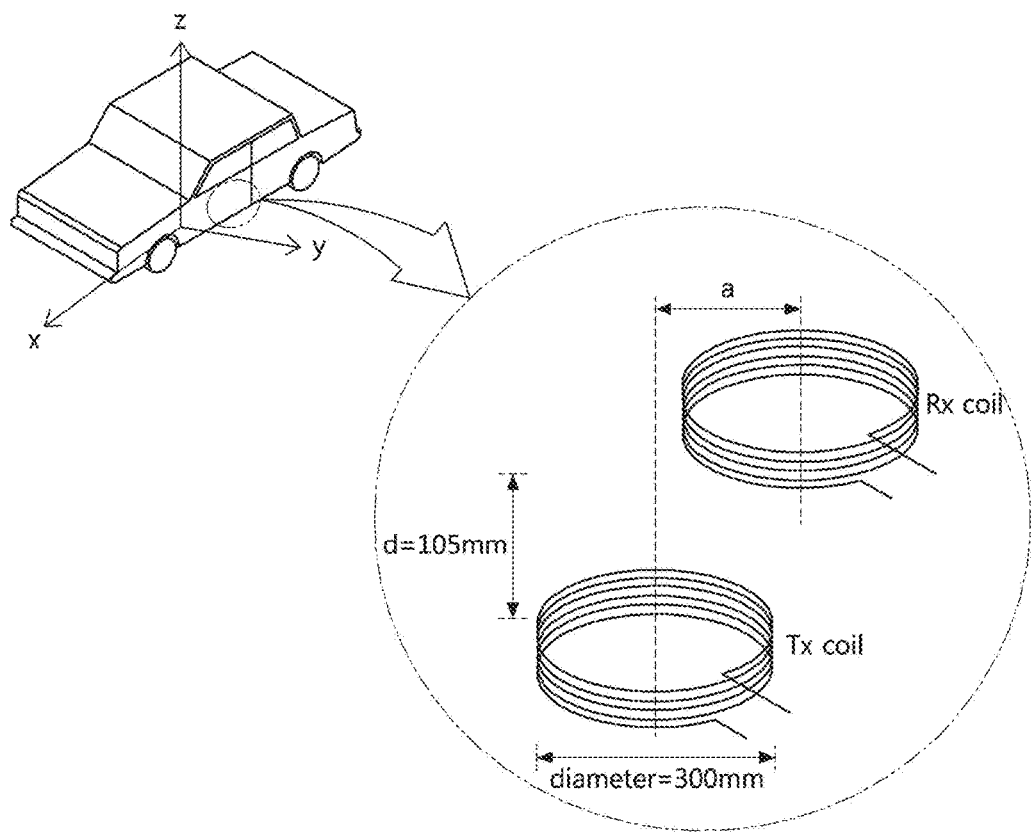
FIG. 1 is a diagram explaining alignment between wireless power transfer coils in a conventional EV.
Figure 2:
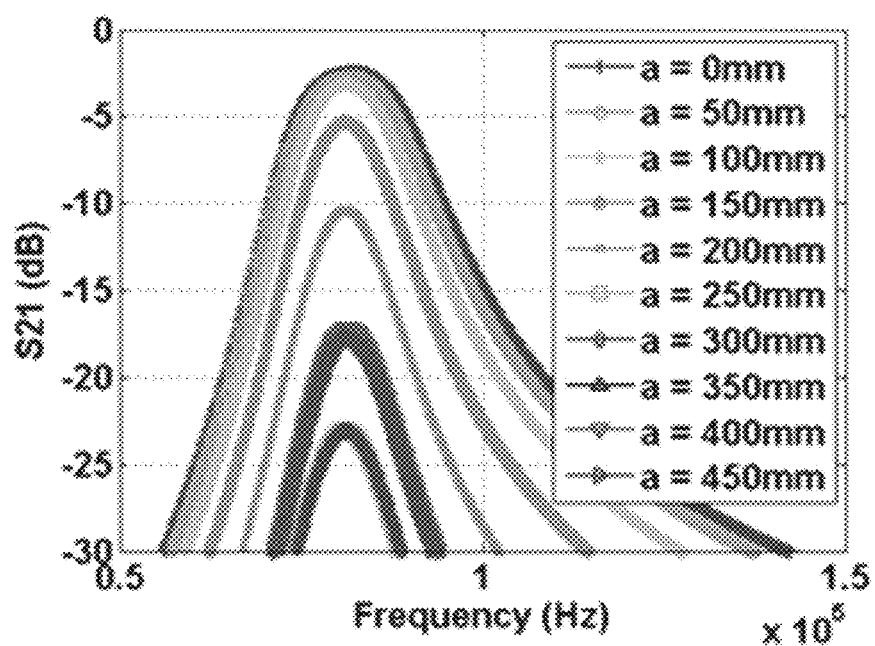
FIG. 2 is a graph illustrating change of wireless power transfer efficiency according to errors of alignment shown in FIG. 1.

Exemplary embodiments of the present disclosure are disclosed herein. However, specific structural and functional details disclosed herein are merely representative for purposes of describing exemplary embodiments of the present disclosure, however, exemplary embodiments of the present disclosure may be embodied in many alternate forms and should not be construed as limited to exemplary embodiments of the present disclosure set forth herein. While describing the respective drawings, like reference numerals designate like elements.

It will be understood that although the terms "first", "second", etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows:

'Electric Vehicle, EV': An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

'Plug-in Electric Vehicle, PEV': An Electric Vehicle that recharges the on-vehicle primary battery by connecting to the power grid.

'Plug-in vehicle, PV': An electric vehicle rechargeable through wireless charging from electric vehicle supply equipment (EVSE) without using a physical plug or a physical socket.

'Heavy duty vehicle; H.D. Vehicle': Any four-or more wheeled vehicle as defined in 49 CFR 523.6 or 49 CFR 37.3 (bus).

'Light duty plug-in electric vehicle': A three or four-wheeled vehicle propelled by an electric motor drawing current from a rechargeable storage battery or other energy devices for use primarily on public streets, roads and highways and rated at less than 4,545 kg gross vehicle weight.

'Wireless power charging system, WCS': The system for wireless power transfer and control between the GA and VA including alignment and communications. This system transfers energy from the electric supply network to the electric vehicle electromagnetically through a two-part loosely coupled transformer.

'Wireless power transfer, WPT': The transfer of electrical power from the AC supply network to the electric vehicle by contactless means.

'Utility': A set of systems which supply electrical energy and include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

'Smart charging': A system in which EVSE and/or PEV communicate with power grid in order to optimize charging ratio or discharging ratio of EV by reflecting capacity of the power grid or expense of use.

'Automatic charging': A procedure in which inductive charging is automatically performed after a vehicle is located in a proper position corresponding to a primary charger assembly that can transfer power. The automatic charging may be performed after obtaining necessary authentication and right.

'Interoperability': A state in which component of a system interwork with corresponding components of the system in order to perform operations aimed by the system. Also, information interoperability may mean capability that two or more networks, systems, devices, applications, or components can efficiently share and easily use information without giving inconvenience to users.

'Inductive charging system': A system transferring energy from a power source to an EV through a two-part gapped core transformer in which the two halves of the transformer, primary and secondary coils are physically separated from one another. In the present disclosure, the inductive charging system may correspond to an EV power transfer system.

'Inductive coupler': The transformer formed by the coil in the GA Coil and the coil in the VA Coil that allows power to be transferred with galvanic isolation.

'Inductive coupling': Magnetic coupling between two coils. In the present disclosure, coupling between the GA Coil and the VA Coil.

'Ground assembly, GA': An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

'Vehicle assembly, VA': An assembly on the vehicle consisting of the VA Coil, rectifier/power conversion unit and VA controller as well as the wiring to the vehicle batteries and between each unit, filtering circuits, housing (s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

'Primary device': An apparatus which provides the contactless coupling to the secondary device. That is, the primary device may be an apparatus external to an EV. When the EV is receiving power, the primary device may act as the source of the power to be transferred. The primary device may include the housing and all covers.

'Secondary device': An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

'GA controller': The portion of the GA which regulates the output power level to the GA Coil based on information from the vehicle.

'VA controller': The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

'Magnetic gap': The vertical distance between the plane of the higher of the top of the litz wire or the top of the magnetic material in the GA Coil to the plane of the lower of the bottom of the litz wire or the magnetic material in the VA Coil when aligned.

'Ambient temperature': The ground-level temperature of the air measured at the subsystem under consideration and not in direct sun light.

'Vehicle ground clearance': The vertical distance between the ground surface and the lowest part of the vehicle floor pan.

'Vehicle magnetic ground clearance': The vertical distance between the plane of the lower of the bottom of the litz wire or the magnetic material in the VA Coil mounted on a vehicle to the ground surface.

'VA Coil magnetic surface distance': the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmission coil.

'Exposed conductive component': A conductive component of electrical equipment (e.g. an electric vehicle) that may be touched and which is not normally energized but which may become energized in case of a fault.

'Hazardous live component': A live component, which under certain conditions can give a harmful electric shock.

'Live component': Any conductor or conductive component intended to be electrically energized in normal use.

'Direct contact': Contact of persons with live components. (See IEC 61440)

'Indirect contact': Contact of persons with exposed, conductive, and energized components made live by an insulation failure. (See IEC 61140)

'Alignment': A process of finding the relative position of primary device to secondary device and/or finding the relative position of secondary device to primary device for the efficient power transfer that is specified. In the present disclosure, the alignment may direct to a fine positioning of the wireless power transfer system.

'Pairing': A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

'Command and control communication': The communication between the EV supply equipment and the EV exchanges information necessary to start, control and terminate the process of WPT.

'High level communication (HLC)': HLC is a special kind of digital communication. HLC is necessary for additional services which are not covered by command & control communication. The data link of the HLC may use a power line communication (PLC), but it is not limited.

'Low power excitation (LPE)': LPE means a technique of activating the primary device for the fine positioning ad pairing so that the EV can detect the primary device, and vice versa.

'Service set identifier (SSID)': SSID is a unique identifier consisting of 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

'Extended service set identifier (ESSID)': ESSID is the name of the network to which you want to connect. It is similar to SSID but can be a more extended concept.

'Basic service set identifier (BSSID)': BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is installed in home, office, public place, road, parking area, etc.

In an exemplary embodiment according to the present disclosure, the light load driving or light load operation may include, for example, charging the high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, preferred exemplary embodiments according to the present disclosure will be explained in detail by referring to accompanying figures.

Figure 3:
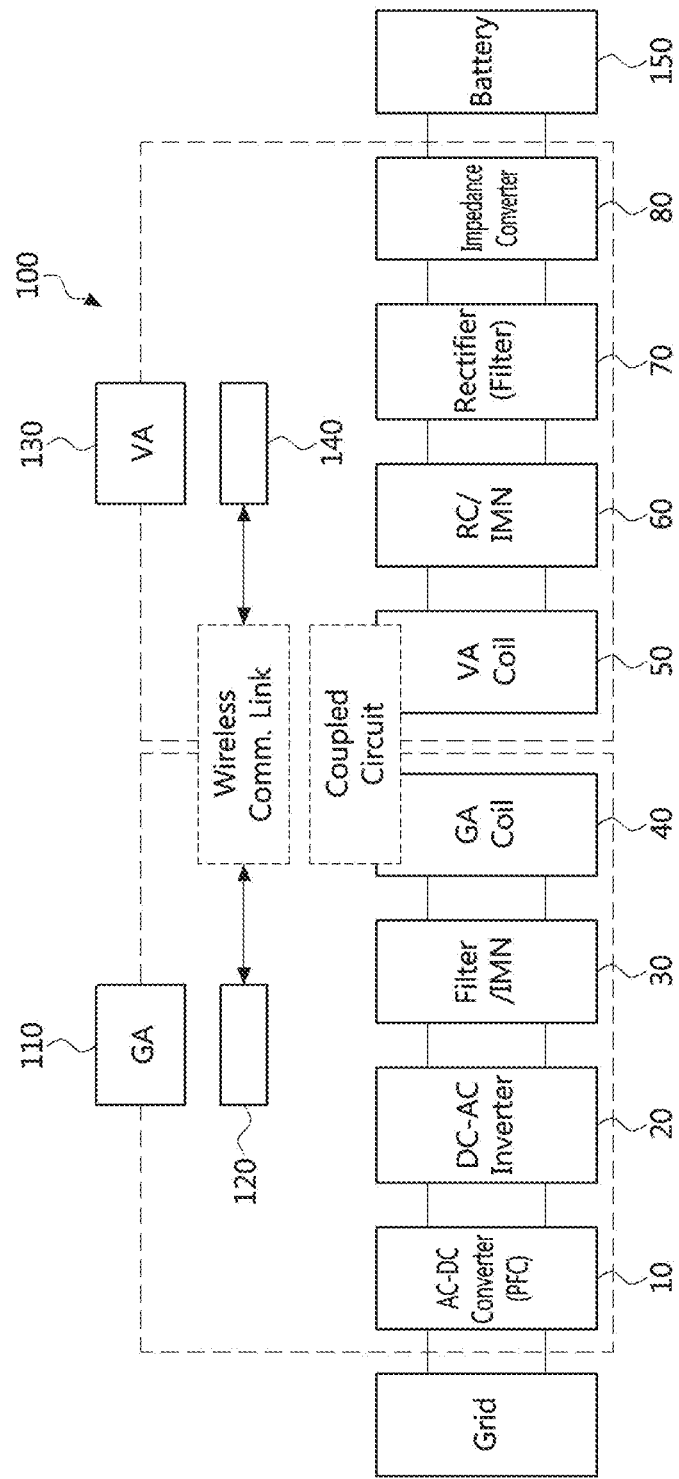
FIG. 3 is a conceptual diagram illustrating a wireless power transfer system using an alignment method for wireless power transfer coils according to an exemplary embodiment of the present disclosure.

FIG. 3 is a conceptual diagram illustrating a wireless power transfer system using an alignment method for wireless power transfer coils according to an exemplary embodiment of the present disclosure.

Referring to FIG. 3, a wireless power transfer system 100 according to an exemplary embodiment of the present disclosure may comprise a ground assembly (GA) 110 and a vehicle assembly (VA) 130.

The GA 110 may include an alternating current to direct current (AC-DC) converter 10 having a power factor correction (PFC) function connected to a grid, a direct current to alternating current (DC-AC) inverter 20, a filter/impedance matching network (IMN) 30, and a GA coil (referred to also as 'primary coil') 40. In addition, the GA 110 may further include a GA controller 120.

The VA 130 may include a VA coil (referred to also as 'secondary coil') 50 forming a magnetic coupled circuit with the GA coil 40, a resonant circuit (RC)/IMN 60, a rectifier/filter 70, and an impedance converter 80. The impedance converter 80 may be coupled to the vehicle's high voltage battery 150. In addition, the VA 130 may further include a VA controller 140.

The GA controller 120 and the VA controller 140 may be connected to each other via a wireless communication link. In an exemplary embodiment, the GA controller 120, the VA controller 140, or a combination of them may include an alignment apparatus which will be described later or perform a function corresponding to the alignment apparatus.

Figure 4:
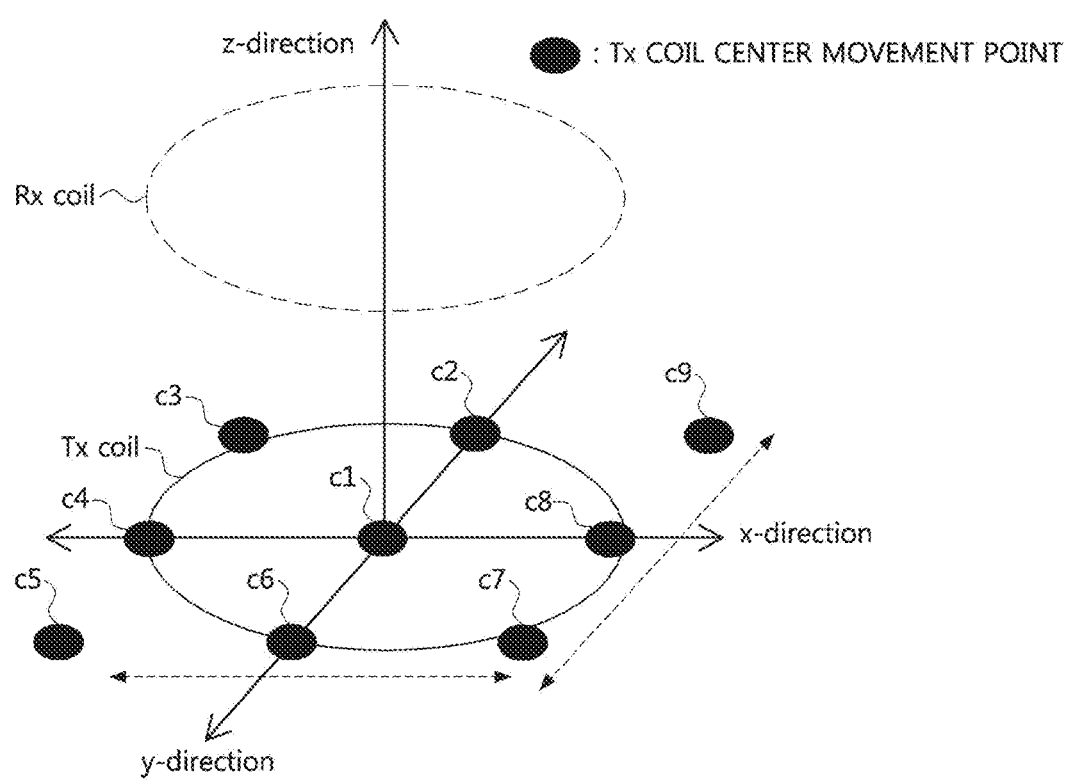
FIG. 4 is a diagram explaining an operation principle of an alignment method for wireless power transfer coils according to an exemplary embodiment of the present disclosure.

FIG. 4 is a diagram explaining an operation principle of an alignment method for wireless power transfer coils according to an exemplary embodiment of the present disclosure.

Referring to FIG. 4, in an alignment method according to an exemplary embodiment, the position of the primary coil Tx may be adjusted in x-direction or y-direction when the position of the secondary coil Rx is constant, while measuring a physical quantity induced in the primary coil by emission power of the secondary coil at a plurality of predetermined measurement positions on the movement path, and relative positions of the primary coil with respect to the secondary coil may be estimated based on the measured values of the physical quantities.

In the alignment method according to an exemplary embodiment, a center point (i.e., reference center point '$c1$') determined at a current position of the primary coil (Tx coil) and a plurality of center movement points $c2$, $c3$, $c4$, $c5$, $C6$, $c7$, $c8$ and $c9$ determined with respect to the reference center point $c1$ may be used. Here, the center movement points are points located on the movement path along which the reference center point moves when the primary coil moves. Since the physical quantities are measured at these points, they may be referred to also as measurement points. The center movement points $c2$ to $c9$ may correspond to a set of points (referred to as 'candidate group') where the reference center point $c1$ is moved according to a predetermined time interval or a predetermined distance interval, when the primary coil (Tx coil) moves.

In an exemplary embodiment, the Tx coil may be controlled such that its reference center point $c1$ is moved to the center movement points $c2$, $c3$, $c4$, $c5$, $c6$, $c7$, $c8$ and $c9$ according to the described order, during the alignment operation of the wireless power transfer system.

The reference center point $c1$ and the center movement points $c2$ to $c9$ may have a predetermined order in the movement path, and adjacent center movement points in the movement path may have a constant interval. However, without being restricted thereto, the center movement points may have a predetermined pattern in the movement path according to various movement types of the reference center point.

For example, in another exemplary embodiment, it may also be possible to employ a radial movement path in which the reference center point sequentially goes back and forth to respective center movement points. However, in this case, since the movement path is longer than that in the case of moving the reference center point in a predetermined order, for example, in a spiral form, the time needed for the alignment operation may become longer.

In addition, in the movement path of the reference center point $c1$, the interval between the adjacent center movement points according to the movement order may not be limited to a constant interval, but may be configured according to a predetermined pattern in which the interval gradually increases or decreases.

Also, the reference center point and the plurality of center movement points may be arranged on a first plane that is orthogonal to the central axis of the primary coil having a circular shape or a plane that is parallel to the first plane. Here, the primary coil having a circular shape refers to a circular primary coil, but it may not be limited thereto. That is, the circular shape may correspond to an inscribed circle or a circumscribed circle of a square-shaped primary coil. The primary coil having the circular shape may have a shape contacting the inner or outer three sides of the rectangular primary coil.

Also, the type of the primary coil may be solenoid polarized type, DD (double-D) polarized type, multi-coil double-D quadrature (DDQ) type, or multi-coil bipolar type. For example, the circular primary coil may correspond to a simplified coil shape having a reference center point at a specific point in the internal region of the primary coil or at an internal center (e.g., face, volume, or volume center) of the primary coil of the above-described conventional type.

As described above, voltage, current, power, power transfer efficiency, coupling coefficients or a combination thereof, which are induced in the primary coil, may be measured using the alignment method according to the present embodiment while moving the primary coil along a predetermined path with respect to the secondary coil, which is in a fixed position and generates a predetermined electromagnetic force. Also, the movements and measurements may be repeated to locate the primary coil at the alignment position having the target power transfer efficiency.

Figure 5:
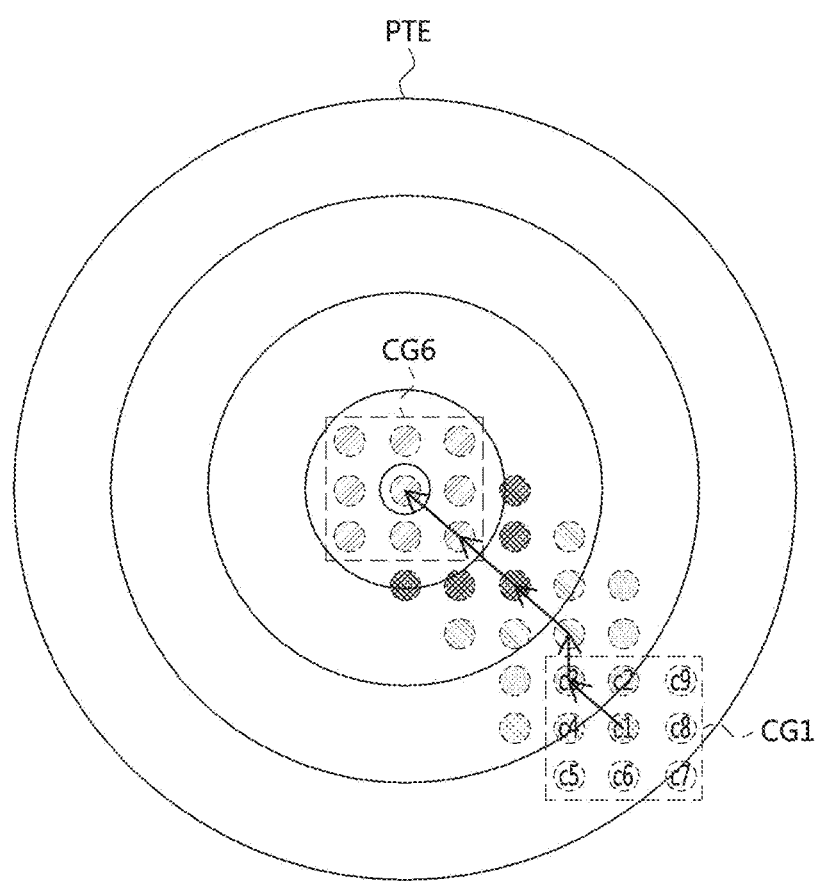
FIG. 5 is an exemplary view explaining an operation principle of an alignment method for wireless power transfer coils according to an exemplary embodiment of the present disclosure.

FIG. 5 is an exemplary view explaining an operation principle of an alignment method for wireless power transfer coils according to an exemplary embodiment of the present disclosure.

Referring to FIG. 5, an alignment method according to an exemplary embodiment may comprise the following steps.

First, an apparatus (alignment apparatus) that performs an alignment method primarily may move a primary pad including the primary coil along a predetermined path. Here, the primary coil may be included in the GA within a parking area in which the EV is parked. The movement of the primary pad may be started when it is sensed that the EV is parked within the parking area or according to establishment of a communication channel between a VA controller of the EV and a GA controller of the GA.

Then, physical quantities are measured for a plurality of measurement points belonging to a first candidate group (CG1) in the predetermined path according to the primary movement of the primary pad. The physical quantity to be measured may include voltage, current, intensity of magnetic field, intensity of electric field, power, power transfer efficiency, coupling coefficient, or a combination thereof induced in the primary coil by the secondary coil. In the present embodiment, the first candidate group includes one reference center point $c1$ and eight center movement points $c2$ to $c9$, but is not limited thereto.

Then, the alignment apparatus may determine the point having the largest physical quantity among the nine physical quantities of the first candidate group CG1 to be a new reference center point. That is, the point having the largest physical quantity among the old reference center point and the center movement points may become the new reference center point.

For example, the position of the reference center point may be moved diagonally to any one of the center movement points $c3$, $c5$, $c7$, and $c9$ located at four corners in the 3×3 matrix array, or moved in the plane direction to any one of the center movement points $c2$, $c4$, $c6$, and $c8$ located at the centers of four sides in the x- and y-directions.

Then, the primary pad may move in a second order along a predetermined path. The secondary movement path may be the same as the primary movement path, but it is not limited thereto and may be another path. Also, second physical quantities may be measured for a plurality of measurement points belonging to a second candidate group along the second movement path, and the current reference center point may be moved to a specific center movement point determined by the second measured physical quantities.

Then, the physical quantity measurements for the candidate groups and the movements of the reference center point may be repeatedly performed until the magnitude or intensity of the physical quantity becomes larger than or equal to the reference physical quantity.

In the present embodiment, the physical quantity measurement may be performed from the first candidate group CG1 to the sixth candidate group CG6. According to the measurement of the physical quantities for the first candidate group CG1, the reference center point of the first candidate group CG1 is shifted by one point in the diagonal direction. Also, in accordance with the measurement of the physical quantities for the second candidate group, the reference center point of the second candidate group CG2 is shifted by one point in the plane direction. Also, in accordance with the measurement of the physical quantities in the third to fifth candidate groups CG3 to CG5, the reference center point is moved by three points in the diagonal direction. Finally, according to the measurement result of the physical quantities at the sixth candidate group CG6, it is determined that the primary coil is aligned with the secondary coil within a certain error range, and the current alignment operation is completed without further moving the reference center point.

As described above, in the present embodiment, when moving the reference center point defined on the primary pad on which the primary coil is mounted along a predetermined path, the physical quantity of each point is measured in the reference center point and the set of center movement points (candidate group) on the movement path. Then, the primary pad may be moved by a desired distance in a desired direction based on the measured physical quantities or the difference therebetween, thereby aligning the primary coil with respect to the secondary coil at a desired position.

Meanwhile, when there are a plurality of largest values (peak values) in the values of the physical quantities measured for the candidate group, the alignment apparatus performing the alignment method may be implemented to consider the intensities or sizes of the physical quantities measured at the previous candidate group or select any one of the plurality of peak values in consideration of the immediately preceding moving direction of the reference center point.

Also, in another exemplary embodiment, the alignment apparatus may be configured to move the reference center point in turn to a plurality of center movement points having peak values in the candidate group, measure physical quantities at measurement points included in each candidate group corresponding to each of the shifted reference center points, and move the reference center point finally to a center movement point corresponding to a candidate group including the center movement point having the largest physical quantity among the measured physical quantities or a center movement point corresponding to a candidate group having the largest average physical quantity.

Also, in the candidate group described above, the interval between the specific point and another point adjacent thereto may be changed in proportion to the power transferred from or the intensity of the magnetic field induced by the secondary coil. If the interval is large, the calculation amount of the number of calculations for the alignment operation may be reduced. Of course, the interval between adjacent points in the candidate group may be limited depending on the driving range of the actuator or the moving means for controlling the movement of the primary pad, but such limitation will be considered separately, and be omitted here.

Figure 6:
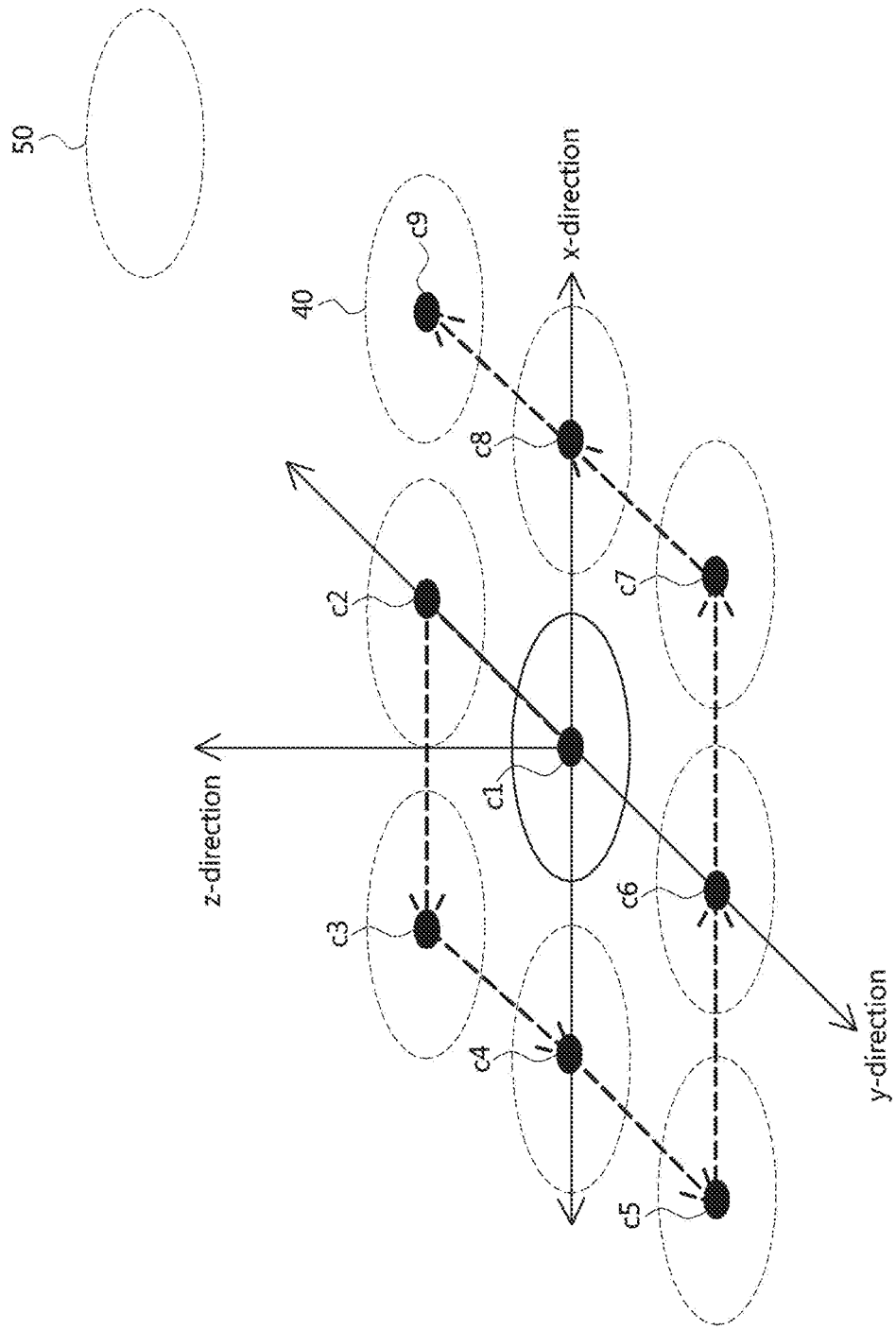
FIGS. 6 to 8 are exemplary views explaining main operation procedures of the alignment method illustrated in FIG. 5.
Figure 7:
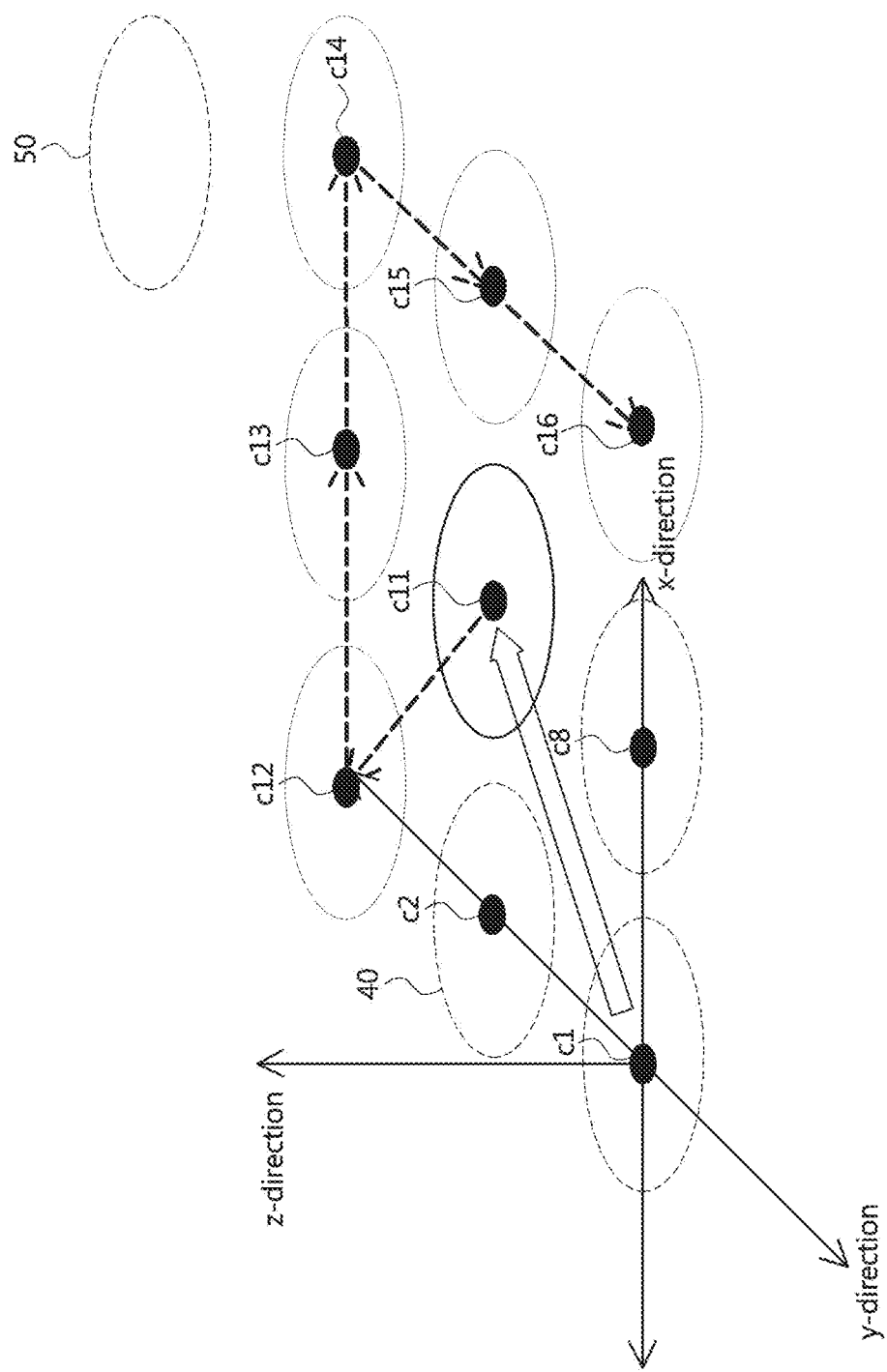
Figure 8:
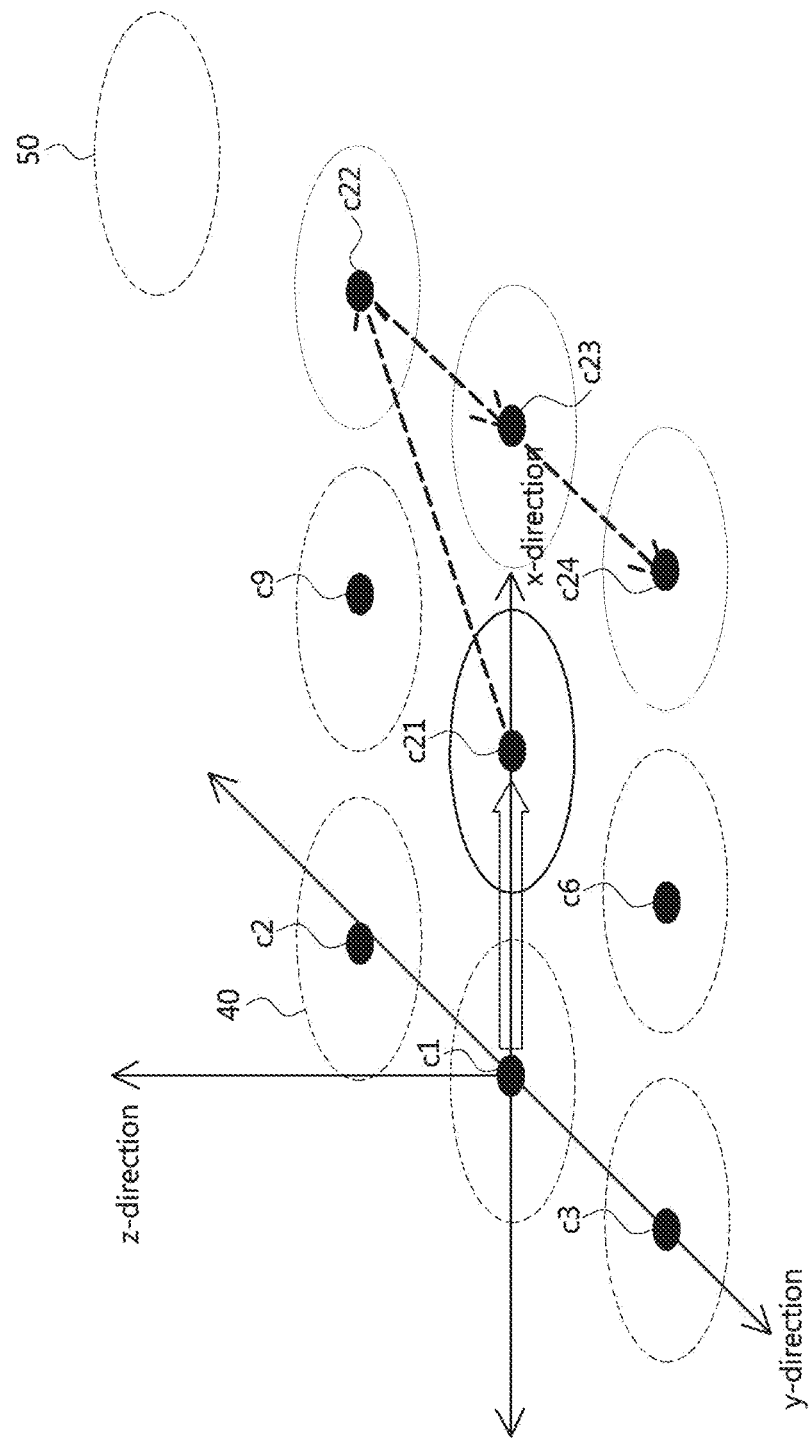

FIGS. 6 to 8 are exemplary views explaining main operation procedures of the alignment method illustrated in FIG. 5.

First, referring to FIG. 6, in the alignment method according to an exemplary embodiment of the present disclosure, a spiral movement path may be applied to a candidate group array constituting a 3×3 matrix in order to align the primary coil 40 with respect to the secondary coil 50.

That is, the movement path of the primary coil 40 may be configured to start from the reference center point $c1$, move to a center movement point $c2$ located at one center of one side of a virtual rectangular shape formed for the candidate group, sequentially move to the center movement points $c3$, $c4$, $c5$, $c6$, $c7$, and $c8$ counterclockwise, and finally move to the final center movement point $c9$.

In this way, in the present embodiment, the primary coil 40 may be moved such that its reference center point $c1$ is located at the center movement point of the lateral direction (or in the plane direction) or at the center movement point located at the diagonal corner, and may be moved sequentially through the remaining center movement points in the clockwise or counterclockwise direction at the center movement point.

According to the present embodiment, the time required for the alignment may be reduced by using the spiral-shaped movement path at the candidate group (i.e., by minimizing the movement path at the candidate group).

The alignment operation according to the above-described movement of the reference center point in the primary coil will be described in further detail. As shown in FIG. 7, in the case that the reference center point has been moved in the diagonal direction according to the measurement result of the physical quantities at the previous candidate group, the newly formed candidate group for the new reference center point $c11$ may have a shortened movement path since the four points $c1$, $c2$, $c8$, and $c11$ (previously, $c9$) for which the physical quantities have already been measured in the previous candidate group can be omitted.

The movement path for the current reference center point $c11$ of the primary coil 40 in the present embodiment may comprise moving the current reference center point to either one of the two center movement points $c12$ and $c16$ (i.e., two opposing measurement points) located at a direction substantially orthogonal to the previous movement direction of the reference center point $c11$, and then sequentially moving to the remaining four center movement points $c13$, $c14$, $c15$ and $c16$ in the clockwise direction.

Also, depending on the implementation, the alignment apparatus may first move the reference center point c11 of the primary pad or primary coil 40 to the center movement point c16, and then sequentially move it to the remaining center move points c15, c14, c13 and c12 counterclockwise in the described order.

Also, the exemplary embodiment of the alignment operation according to the movement of the reference center point in the primary coil will be described in further detail. As shown in FIG. 8, in the case that the reference center point has been moved to the center in the plane direction of the candidate group according to the measurement result of the physical quantities at the previous candidate group, the newly formed candidate group for the new reference center point c21 may have a shortened movement path since measurements of physical quantities for six points c1, c2, c3, c6, c9, and c21 (previously, c8) included in the previous candidate group can be omitted.

In the present embodiment, the shortened movement path may be configured to start from the center point c21, move to one c22 of the two center movement points c22 and c24 located on the diagonal line in the forward direction in the moving direction of the previous reference center point, and then move to the remaining two center movement points c23, c24 in the y-direction.

When the candidate group movement path described above is employed, candidate groups having a block shape with a constant width (see CG1 or CG6) are moved step by step while being compared with previous candidate groups, and physical quantities only at the newly added points may be measured, such that the alignment operation can be performed quickly.

Figure 9:
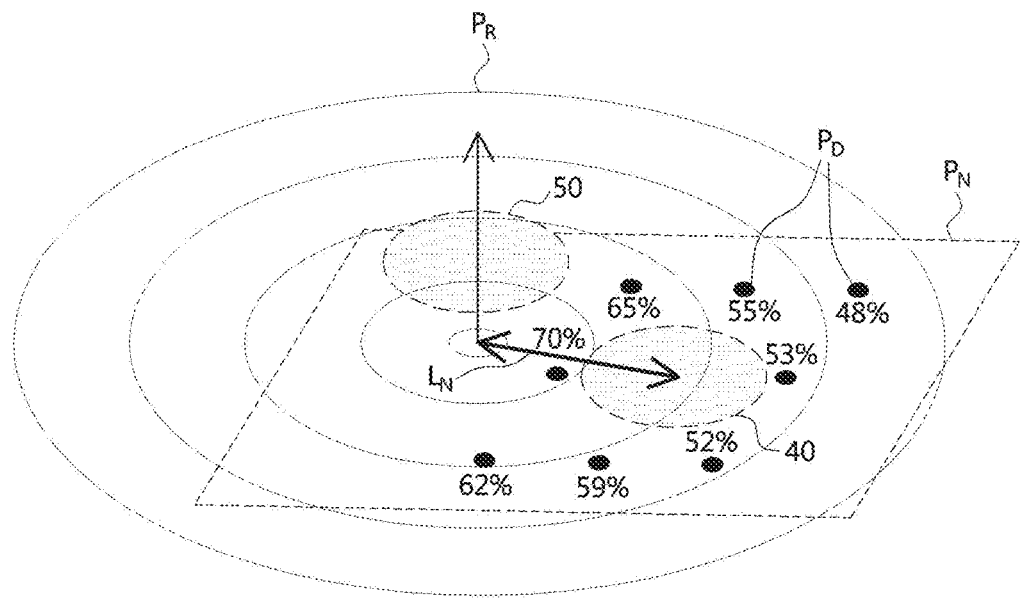
FIG. 9 is an exemplary view explaining an operation principle of an alignment method according to another exemplary embodiment of the present disclosure.

FIG. 9 is an exemplary view explaining an operation principle of an alignment method according to another exemplary embodiment of the present disclosure.

Referring to FIG. 9, in the alignment method according to the present embodiment, when the position of the primary coil is constant, the secondary coil may be aligned with the primary coil by moving the reference center point to a point having the greatest magnetic field strength among measurement points belonging to a candidate group based on the electromagnetic force or the physical quantity induced by the electric power from the primary coil. Here, the primary coil may be the GA coil included in the GA and the secondary coil may be the VA coil included in the VA.

The above-described alignment method according to the present embodiment may be substantially same as the alignment method described with reference to FIGS. 3 to 8, except that the role of the primary coil and the secondary coil are reversed. Therefore, detailed description is omitted in order to avoid duplication of description.

Figure 10:
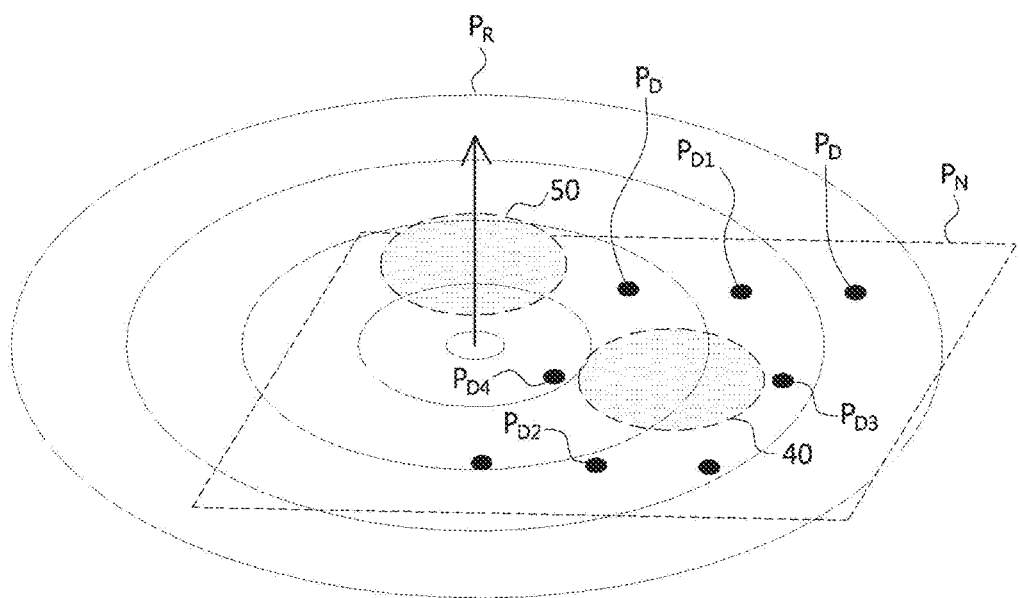
FIG. 10 is an exemplary view explaining an operation principle of an alignment method according to yet another exemplary embodiment of the present disclosure.

FIG. 10 is an exemplary view explaining an operation principle of an alignment method according to yet another exemplary embodiment of the present disclosure.

Referring to FIG. 10, in the alignment method according to the present embodiment, an alignment apparatus for carrying out a series of procedures or programs for implementing the method may set a reference center point (for example, a point on the central axis)), and move the primary coil 40 along a predetermined path. When the primary coil 40 moves, physical quantities may be measured at respective points of a set $P_D$ of the center movement points obtained by the movement of the reference center point for a predetermined period of time or at regular intervals, and a measured profile obtained by the measured physical quantities may be compared with a reference profile $P_R$ stored in advance in the storage of the alignment apparatus so that a current position of the primary coil 40 with respect to the magnetic center of the secondary coil 50 can be estimated.

That is, in the alignment method according to the present embodiment, the initial position of the primary coil 40 and the estimated position of the magnetic center of the secondary coil may be calculated by comparing the reference profile $P_R$ and the measured profile $P_N$, and the optimum position of the primary coil 40 for alignment with the coil 50 can be identified.

In other words, in the alignment method, data on a physical quantity or efficiency formed when the magnetic field for alignment is transmitted from the secondary coil 50 is stored in advance in the form of a look-up table, and the initial positions of the primary coil 40 and the estimated position of the secondary coil 50 can be determined based on the look-up table or the reference profile including the measured profile of the physical quantities measured at the candidate group of the primary coil and the efficiency data of the secondary coil such that the optimal alignment position of the primary coil 40 with respect to the secondary coil 50 can be identified based thereon. The physical quantity or efficiency may include voltage, current, power, coupling coefficients or a combination thereof.

The efficiency data included in the reference profile or the reference profile, as a value corresponding to the physical quantity, can be converted into a function on a rectangular coordinate system in which the position of the primary coil is changed according to the intensity of the alignment magnetic field of the secondary pad in the parking space in which the primary pad is disposed.

In the measurement profile, the reference center point of the primary coil and the number of points in the set of center movement points with respect to the movement position of the reference center point may be appropriately adjustable. However, since the size of the reference profile or the look-up table varies depending on the number of points, the number of points may be appropriately selected in consideration of the performance of the alignment apparatus, the alignment operation speed, and the like in the alignment method of the present embodiment.

The above-described primary coil may be included in the GA, the secondary coil may be included in the VA mounted on the vehicle, and the alignment apparatus may be at least some of the functional components or components of the GA controller. The GA controller or the alignment apparatus may detect a predetermined size of power or magnetic field emitted from the secondary coil through the primary coil in a parking area where the vehicle equipped with the secondary coil is parked.

The average value of the predetermined size of power or magnetic field may be at least half that of the average value of power transferred from the primary coil or power received at the secondary coil during the wireless power transfer. In addition, data of efficiency or physical quantity, or a reference profile containing it, may be provided from the VA to the ground side alignment apparatus via the GA.

The relative position of the primary coil relative to the secondary coil may correspond to the relative position of the primary pad relative to the secondary pad. Once the relative position of the primary pad relative to the secondary pad is estimated, the ground side alignment apparatus or the GA controller performing a function corresponding to such the apparatus may perform the alignment by moving the position of the primary coil in the direction in which the interval between a first extension line including the center axis of the secondary coil and a second extension line going through the reference center point of the primary coil is to be narrowed.

In addition, according to the implementation, once the relative position of the primary pad with respect to the secondary pad is estimated, the ground side alignment apparatus or the GA controller may transfer the current position information of the primary pad with respect to the secondary pad, or movement request information for requesting to move the secondary pad based on the position information of the primary pad to a VA controller or an alignment apparatus that connected to the VA controller or includes at least some of the functionalities or components. In this case, on the basis of the current position information of the primary pad and the movement request information, the vehicle side alignment apparatus may move the center point of the secondary pad or the secondary coil in the direction and by the distance corresponding to the reference center point and the specific center movement point in the candidate group.

As described above, according to the present embodiment, on the basis of the reference profile $P_R$ for the alignment magnetic field strength of the secondary coil 50 and the measured profile $P_N$ according to the physical quantities at the candidate group of the primary coil 40, the alignment between the primary coil and the secondary coils can be performed effectively. The measured profile may include planes or curved surfaces that include measured values.

Figure 11:
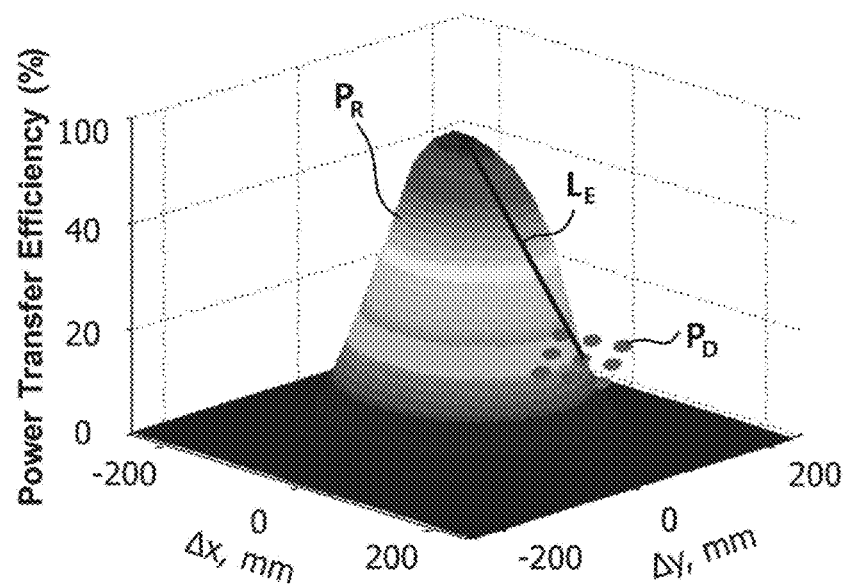
FIG. 11 is an exemplary view explaining main operation procedures applied to the alignment method illustrated in FIG. 10.

FIG. 11 is an exemplary view explaining main operation procedures applied to the alignment method illustrated in FIG. 10.

Referring to FIG. 11, in the alignment method according to the present embodiment, the efficiency data value of the candidate group with respect to the magnetic field strength for alignment of the secondary coil based on the reference center point of the primary coil.

Then, the position of the secondary coil may be estimated by finding the most similar value or a set of similar values with the measured values for the candidate group in the prepared look-up table. The efficiency data value measured at the candidate group may be converted to a position value $L_E$.

The value of the look-up table may be a position value, but is not limited thereto. The value of the look-up table may be an efficiency data value set in advance based on each position. The reference profile or look-up table may include power transfer efficiency as efficiency, and may include $\Delta x$ and $\Delta y$ as position values in a rectangular coordinate system having x-axis and y-axis. The measured efficiency data value may be calculated as a position value after matching with the reference values of the look-up table.

Then, the alignment apparatus may convert the position value into a vector value (see $L_N$ in FIG. 10) including the distance and the angle between the reference center point of the primary coil and the central axis of the secondary coil.

Then, the alignment apparatus may move the reference center point of the primary coil to the center of the primary coil using the vector value. The above procedure may be repeated one or more times until the vector value approaches 0 or 0 within a certain error range. The movement of the reference center point may be performed at once using the look-up table, but it may be repeatedly performed in a moving form similar to that of FIGS. 3 to 8, depending on the implementation.

Meanwhile, the magnitude of the physical quantity at each point of the measurement profile in FIG. 11 is not clearly shown, but it may have values shown in the following table 1.

TABLE 1

| | | |
|---|---|---|
| 65% | 55% | 48% |
| 70% | 57% | 53% |
| 62% | 59% | 52% |

As illustrated in the table 1 above, the measurement profile may be an efficiency data value corresponding to each point of the candidate group in the described transverse and longitudinal order. The efficiency data value may have, but is not limited to, a criterion that the efficiency data value on the surface of the secondary coil is set to 100%.

Figure 12:
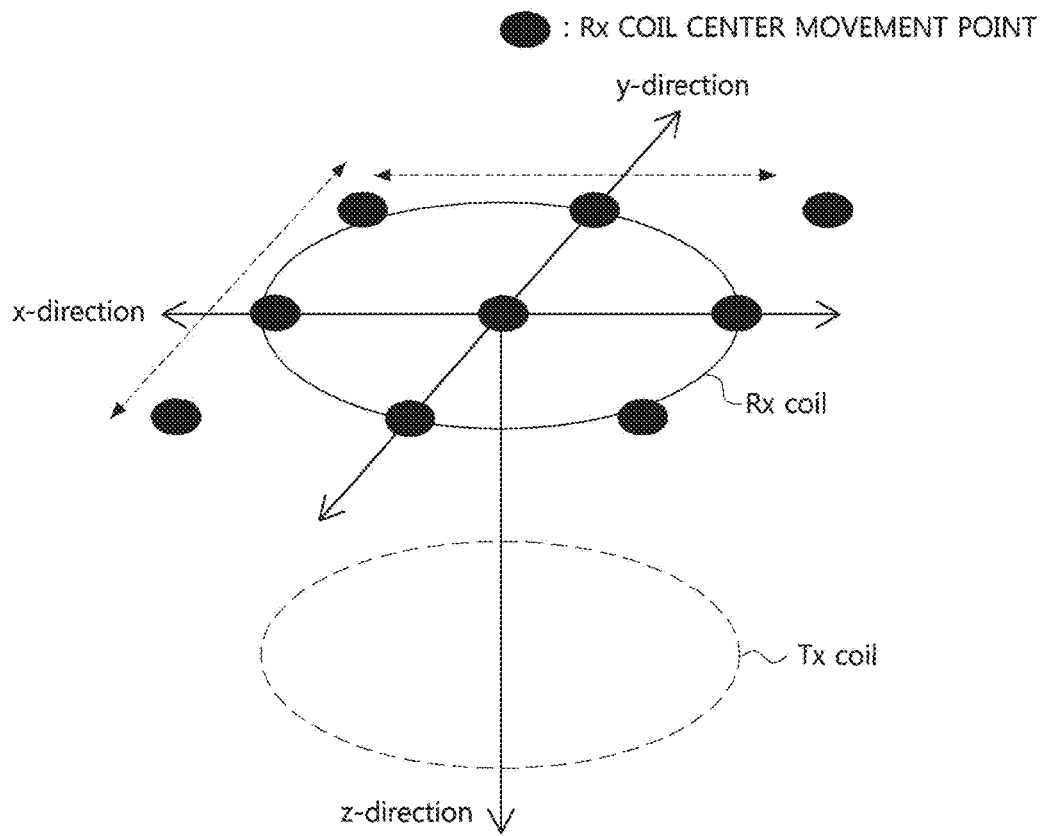
FIG. 12 is an exemplary view explaining other operation procedures applied to the alignment method illustrated in FIG. 10.

FIG. 12 is an exemplary view explaining other operation procedures applied to the alignment method illustrated in FIG. 10.

Referring to FIG. 12, the alignment method according to the present embodiment may be performed when it is difficult to find the most similar value with the value measured at the candidate group in the look-up table.

For example, when a value similar to the value measured at the current candidate group cannot be found in the look-up table, the alignment apparatus may compare a first value obtained by moving the reference center point of the current candidate group to a specific center movement point (a first center movement point) among center movement points with a second value obtained by moving the reference center point of the current candidate group to a center movement point (a second center movement point) located in the opposite direction to the first center movement point, and move the reference center point to a center movement point corresponding to a candidate group having a larger value or larger mean value.

Here, the first center movement point may be any one of the center movement points $P_{D1}$, $P_{D2}$, $P_{D3}$, and $P_{D4}$, and the second center movement point may be another center movement point $P_{D2}$, $P_{D1}$, $P_{D4}$, or $P_{D3}$ opposite the first center movement point with the reference center point in between. Also, in another implementation, the first center movement point may be set as a center movement point located in the diagonal direction without being set as the center movement point located at the center side in the plane direction.

Also, when it is repeatedly difficult to find a similar value in the look-up table, the alignment apparatus may sequentially select the first center movement point with respect to some center movement points located in the forward side of the direction of the movement performed immediately before, compare the measured values at the candidate group for the first center movement point, and move the reference center point of the primary coil based on the comparison result.

On the other hand, in the alignment method of the present embodiment described above with reference to FIGS. 10 to 12, when the alignment magnetic field is fed out in the primary coil, the VA controller equipped with the secondary coil and mounted on the vehicle or the vehicle side alignment apparatus may be configured to store efficiency data values measure at the secondary coils in the look-up table, and move the reference center point of the secondary coil to the center axis of the primary coil by using the look-up table and the physical quantity value measured at the candidate group including the reference center point of the secondary coil, or provide the relative position information of the secondary coil to the GA controller or the ground side alignment apparatus so that the position of the primary coil can be adjusted based on the relative position information.

This configuration may be substantially same except that the role of the GA including the primary coil or the ground side alignment apparatus coupled thereto and the BA including the secondary side coil and the vehicle side alignment apparatus are reversed. Therefore, detailed description thereof will be omitted in order to avoid duplication of description.

Figure 13:
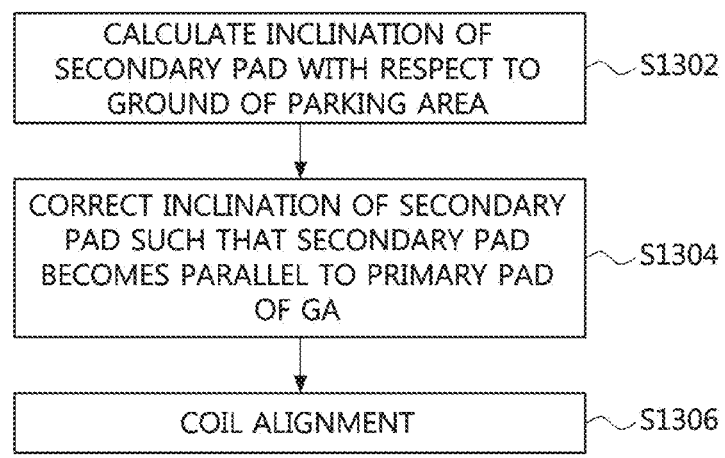
FIG. 13 is a flow chart explaining an alignment method according to another exemplary embodiment of the present disclosure.

FIG. 13 is a flow chart explaining an alignment method according to another exemplary embodiment of the present disclosure.

Referring to FIG. 13, the alignment method according to the present embodiment may include a procedure for correcting the inclination of the secondary pad before performing coil alignment according to the inclination of the vehicle.

More specifically, the VA controller or the electronic control unit (ECU) mounted on the vehicle may calculate the inclination of the vehicle with respect to the ground of the parking area or the inclination angle of the secondary pad mounted on the vehicle in the parking area where the primary pad is disposed (S1302). The inclination angle of the secondary pad may be calculated based on the sensing value of a tire pressure monitoring system (TPMS) mounted on the vehicle, a yaw sensor, a gyro sensor, or the like.

Then, the ECU may correct the inclination of the secondary pad such that the secondary pad becomes parallel to the primary pad of the GA (S1304). This operation may be performed by the vehicle-side ECU or the VA controller, but not limited thereto, and may be performed by the ground-side ECU or the GA controller that receives the corresponding information from the vehicle side. A driving means such as an actuator controlled by an electronic control device or a controller in the secondary pad or the primary pad may be combined.

Then, after the primary pad and the secondary pad are aligned in parallel, the above-described coil alignment described with reference to FIGS. 3 to 13 may be performed (S1306). To this end, the vehicle-side or ground-side ECU may transmit and receive signals or messages relating to the alignment of the primary and secondary coils and completion of the alignment, to or from the GA controller, the ground side alignment apparatus, the VA controller, the vehicle side alignment apparatus or a combination thereof.

FIGS. 14A to 14E are views illustrating various forms of a candidate group applied to an exemplary embodiment of the present disclosure.

In the candidate group which can be applied to an exemplary embodiment of the present disclosure, when the reference center point is moved to any one of the center movement points in the candidate group, the block of the candidate group may be moved by one point while a part of the points in the new candidate group are precisely overlapped with a part of the reference center point and center movement points in the previous candidate group.

Figure 14A:
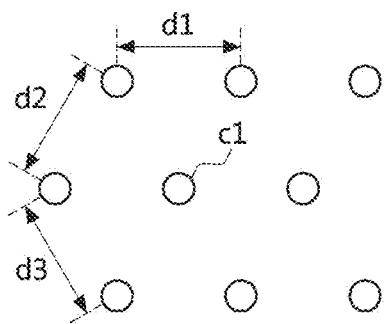
FIGS. 14A to 14E are views illustrating various forms of a candidate group applied to an exemplary embodiment of the present disclosure.
Figure 14B:
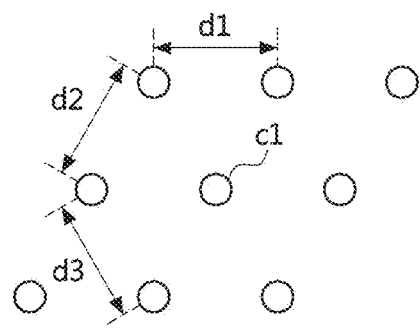
Figure 14C:
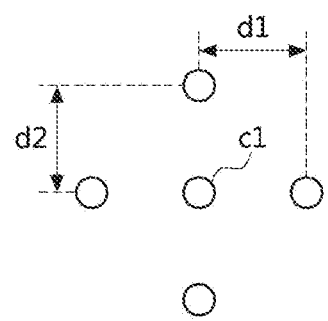
Figure 14D:
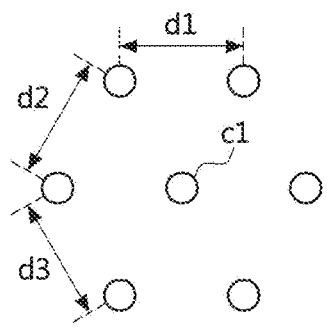
Figure 14E:
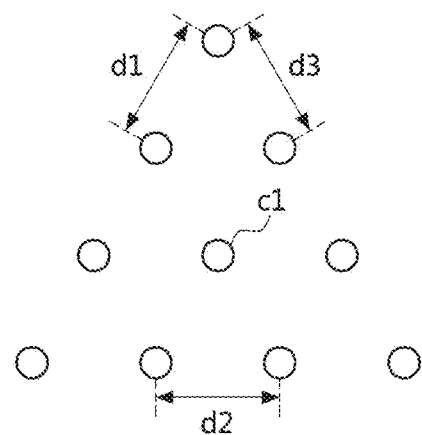

For example, as shown in FIGS. 14A to 14E, the candidate group may be formed in a shape having three regular bracketed parentheses in FIG. 14A, a parallelogram shape in FIG. 14B, a cross shape in FIG. 14C, a hexagon shape in FIG. 14D, triangle shape in FIG. 14E, or the like. Here, the distance between the reference center point c1 and the adjacent center movement points may be constant, and the distances d1, d2, and d3 between the adjacent center movement points may be constant. That is, any candidate group structure including triangles formed by adjacent points having a right triangular shape or a square shape may be used as the candidate group structure applied to the embodiment of the present disclosure.

Figure 15:
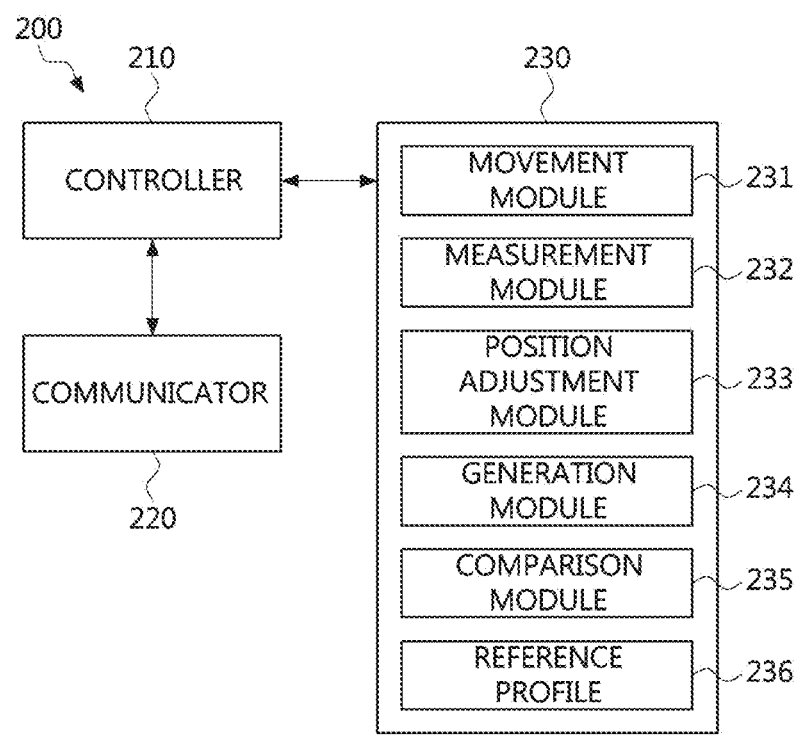
FIG. 15 is a block diagram illustrating an alignment apparatus according to an exemplary embodiment of the present disclosure.

FIG. 15 is a block diagram illustrating an alignment apparatus according to an exemplary embodiment of the present disclosure.

Referring to FIG. 15, an alignment apparatus 200 according to an exemplary embodiment of the present disclosure may comprise a controller 210, a communicator 220, and a storage 230.

The controller 210 may perform an alignment method by executing a module or a program stored in the storage 230. The controller 210 may control the communicator 220 to communicate with the outside, establish a radio channel with a counterpart controller of the wireless power transfer system, and transmit and receive signals and data, if necessary.

The controller 210 may be implemented as a logic controller or a microprocessor. The controller 210 may include one or more cores and a cache memory. In case that the controller 210 has a multi-core structure, a multi-core may refer to two or more independent cores integrated into a single package of a single integrated circuit. Also, in case that the controller 210 has a single core structure, a single core may be referred to as a central processing unit (CPU). The CPU may be implemented as a system on chip (SOC) in which a micro control unit (MCU) and various peripheral devices (integrated circuit for external expansion devices) are disposed together, but the various implementations are not limited thereto. Here, the core may include registers for storing instructions to be processed, arithmetic logical units (ALUs) for comparisons, judgments, and arithmetic operations, an internal control unit for internally controlling CPUs for interpreting and executing instructions, an internal bus, and the like.

Also, the controller 210 may include, but is not limited thereto, one or more data processors, an image processor, or a combination thereof. The controller 210 may include at least one electric control unit (ECU) mounted on the vehicle.

Also, the controller 210 may include a peripheral device interface and a memory interface. In this case, the peripheral device interface is responsible for connection and connection management of the controller 210, the input/output system, and other peripheral devices (the communicator, etc.), and the memory interface may be responsible for connection and connection management between the controller 210 and the storage 230.

The above-described controller 210 may execute various software programs stored in the storage 230 and perform data input, data processing, and data output in order to perform the alignment method according to the embodiments of the present disclosure. That is, the control pat 210 may execute a specific software module (instruction set) stored in the storage 230 and perform various specific functions corresponding to the corresponding module. For example, the controller 210 may effectively perform coil alignment of the EV wireless power transfer system through functions and data implemented or provided by the software modules 231 to 235 stored in the storage 230.

The communicator 220 may connect the alignment apparatus 200 and an external device. The communicator 220 may support a wireless communication protocol and support a wired communication protocol according to various implementations. The communicator 220 may support command and control communication, power line communication (PLC) communication, and high-level communication. The external device may include a GA controller, a VA controller, a vehicle electronic control device, and the like.

The above-described communicator 220 may include one or more wired and/or wireless communication subsystems supporting one or more communication protocols. The wireless communication subsystem may include a radio frequency (RF) receiver, an RF transmitter, an RF transceiver, an optical (e.g., infrared) receiver, an optical transmitter, an optical transceiver, or a combination thereof. Here, the wireless network basically refers to Wi-Fi and Bluetooth, but it is not limited thereto and may include an ultra-wide band (UWB), etc.

The wireless network may include at least some of the functionalities or components of a vehicle communication device or a ground-side communication device that supports magnetic field communication, for example, Global System for Mobile Communication (GSM), Enhanced Data GSM Environment (EDGE), Code Division Multiple Access (CDMA), Wideband Code Division Multiple Access (W-CDMA), Long Term Evolution (LTE), LTE-Advanced (LTE-A), Orthogonal Frequency Division Multiple Access (OFDMA), WiMAX, Wireless Fidelity (Wi-Fi), Bluetooth, and the like.

The storage 230 may store the data and the modules 231 to 235 for implementing the alignment method. The modules may include a movement module 231, a measurement module 232, a position adjustment module 233, a generation module 234, and a comparison module 235.

The movement module 231 may be responsible for a function of moving a reference center point along a predetermined path in a candidate group. The measurement module 232 may measure physical quantities at the reference center point or center movement points of the candidate group. The position adjustment module 233 may take the function of moving the reference center point to a position of one of the center movement points according to the physical quantity measurement result. The generation module 234 may generate a new candidate group according to the movement of the reference center point or may generate a movement path of the reference center point.

Also, the comparison module 235 may compare the look-up table with the efficiency data value of the candidate group and output a similar value in the look-up table as the comparison result. A similar value may be converted to a position value, and the converted position value may be converted to a vector value. For such the conversion, the storage 230 may further store a conversion module. The look-up table may include at least some data of the reference profile 236.

Also, in addition to the reference profile 236 or the look-up table, the storage 230 may store real-time measured efficiency data or a measurement profile including the measured efficiency data.

The aforementioned modules 231 through 235 may have the form of software, a program, an instruction set, or a combination thereof implementing the alignment method. An instruction set may refer to a set of instructions.

The above-described storage 230 may include a high-speed random access memory such as one or more magnetic disk storage devices and/or a non-volatile memory, one or more optical storage devices and/or a flash memory.

Meanwhile, the modules 231 to 235 described above are stored in the storage 230 connected to the GA controller, the ground side alignment apparatus, the VA controller, the vehicle side alignment apparatus, the electronic control device of the vehicle, however, the present disclosure is not limited to such a configuration.

For example, the above-mentioned modules may be stored in a separate computer-readable medium (recording medium) in the form of software for implementing a series of functions (alignment method), or transferred to a remote place in a carrier form to be performed by an alignment apparatus. Such the carrier-type program or software may include source code, intermediate code, executable code, and the like.

That is, the computer-readable medium may be implemented to comprise a program command, a data file, a data structure, etc., alone or in combination. Programs recorded on the computer-readable medium may be those specially designed and constructed for the alignment method according to embodiments of the present disclosure, or may include those known and available to those skilled in the computer software. The computer-readable medium may also include hardware devices that are specially configured to store and execute program instructions, such as ROM, RAM, flash memory, and the like. Program instructions may include machine language codes such as those generated by a compiler, as well as high-level language code that may be executed by a computer using an interpreter or the like. The hardware device may be configured to operate with at least one software module to perform the alignment method according to embodiments of the present embodiment, and vice versa.

While the exemplary embodiments of the present disclosure and their advantages have been described in detail, it should be understood that various changes, substitutions and alterations may be made herein without departing from the scope of the disclosure.

What is claimed is:

1. An alignment method for wireless power transfer coils, the method comprising:
    moving a primary coil such that a reference center point of the primary coil sequentially passes through a plurality of measurement points located on the primary coil or located outside the primary coil, wherein the reference center point and the plurality of measurement points constitute a first candidate group;
    measuring physical quantities induced in the primary coil by a power or a magnetic field of a secondary coil, magnetically coupled with the primary coil at the reference center point, and the plurality of measurement points;
    calculating a relative position of the primary coil with respect to the secondary coil based on the measured physical quantities;
    adjusting a position of the primary coil by moving the reference center point to a measurement point representing a maximum value of the physical quantities;
    measuring second physical quantities for a second candidate group including the moved reference center point and a plurality of measurement points corresponding to the moved reference center point; and
    calculating a second relative position of the primary coil based on the second physical quantities.

2. The alignment method according to claim 1, wherein the reference center point and points adjacent to each other among the measurement points form a triangular or rectangular shape on a movement path including the reference center point and the measurement points or on a plane including the movement path.

3. The alignment method according to claim 2, wherein the step of moving the primary coil is performed along the movement path spirally passing the measurement points from the reference center point.

4. The alignment method according to claim 1, wherein the physical quantities comprise voltage, current, power, power transfer efficiency, coupling coefficients or a combination thereof.

5. The alignment method according to claim 1, wherein the step of measuring the second physical quantities is performed along a second movement path consisting of remaining points of the second candidate group except points overlapped with the points included in the first candidate group.

6. An alignment method for wireless power transfer coils, the method comprising:
   moving a secondary coil mounted on a vehicle such that a reference center point of the secondary coil passes through a plurality of measurement points located on the secondary coil or located outside the secondary coil, wherein the reference center point and the plurality of measurement points constitute a first candidate group;
   measuring physical quantities induced in the secondary coil by a power or a magnetic field of a primary coil magnetically coupled with the secondary coil at the reference center point and the plurality of measurement points;
   calculating a relative position of the secondary coil with respect to the primary coil based on the physical quantities; and
   transmitting, by a vehicle assembly (VA) controller or an alignment apparatus connected to the VA controller controlling operation of the secondary coil, information on the relative position or a position adjustment request signal based the relative position to a ground assembly (GA) controller controlling operation of the primary coil.

7. The alignment method according to claim 6, wherein the reference center point and points adjacent to each other among the measurement points form a triangular or rectangular shape on a movement path including the reference center point and the measurement points or on a plane including the movement path.

8. The alignment method according to claim 7, wherein the step of moving the primary coil is performed along the movement path spirally passing the measurement points from the reference center point.

9. The alignment method according to claim 6, further comprising, after the step of calculating the relative position of the secondary coil,
   adjusting a position of the secondary coil by moving the reference center point to a measurement point representing a maximum value of the physical quantities;
   measuring second physical quantities for a second candidate group including the moved reference center point and a plurality of measurement points corresponding to the moved reference center point; and
   calculating a second relative position of the secondary coil based on the second physical quantities.

10. The alignment method according to claim 9, wherein the step of measuring the second physical quantities is performed along a second movement path consisting of remaining points of the second candidate group except points overlapped with the points included in the first candidate group.

11. An alignment method for wireless power transfer coils, the method comprising:
    moving a primary coil such that a reference center point of the primary coil sequentially passes through a plurality of measurement points located on the primary coil or located outside the primary coil, wherein the reference center point and the plurality of measurement points constitute a first candidate group;
    measuring physical quantities induced in the primary coil by a power or a magnetic field of a secondary coil magnetically coupled with the primary coil at the reference center point and the plurality of measurement points; and
    estimating a current position of the primary coil by comparing the physical quantities at the measurement points with a reference profile including values of the power or magnetic field previously stored according to a moving direction of and a distance from the secondary coil,
    wherein the reference profile includes a look-up table in which the values of the power or magnetic field are stored, and the step of estimating the current position of the primary coil including finding values similar to the physical quantities in the look-up table, and
    wherein, when the values similar to the physical quantities are not found in the step of estimating the current position of the primary coil, the alignment method further comprises, after the step of estimating the current position of the primary coil,
    moving the reference center point to a measurement point representing a maximum value among the physical quantities;
    measuring second physical quantities for a second candidate group including the moved reference center point and a plurality of measurement points corresponding to the moved reference center point; and
    estimating again the current position of the primary coil according to the second physical quantities.

12. The alignment method according to claim 11, wherein the step of estimating the current position of the primary coil includes:
    converting the physical quantities into a position value in a rectangular coordinate system including the values of the power or magnetic field previously stored according to the moving direction of and the distance from the secondary coil; and
    converting the position value into a vector value for the primary coil with respect to the secondary coil.

13. The alignment method according to claim 11, further comprising, when the values similar to the physical quantities are not found in the step of estimating the current position of the primary coil, after the step of estimating the current position of the primary coil,
    sequentially moving the reference center point to two opposing measurement points among the measurement points;
    measuring second and third physical quantities for two candidate groups with the two opposing measurement points as respective reference center points; and
    moving the reference center point to a measurement point having a maximum value among the second and third physical quantities or a measurement point belonging to a candidate group having a larger average value between the two candidate groups,
    wherein the current position of the primary coil is estimated again based on the physical quantities of the candidate group corresponding to the measurement point to which the reference center point is moved.

* * * * *